though it must withstand high pressure and temperature, being only necessarily large enough to insure combustion. Also, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle.

2,874,535

SUBSTITUTED FURANS AS HYPERGOLIC FUELS

Arnold L. Ayers, Idaho Falls, Idaho, and Cleveland R. Scott, Bartlesville, Okla., assignors to Phillips Petroleum Company, a corporation of Delaware No Drawing. Application November 8, 1951
Serial No. 255,528

9 Claims. (Cl. 60—35.4)

This invention relates to rocket propellants. In one of its more specific aspects this invention relates to hypergolic fuels and their application to the propulsion of rockets.

Our invention is concerned with new and novel rocket propellants and their utilization; a rocket or jet propulsion device, being defined herein as a rigid container for matter and energy so arranged that a portion of the matter can absorb energy in kinetic form and subsequently be ejected in a specified direction. The type rocket to which our invention is applied is that type of jet propulsion device designated as a "pure" rocket, i. e., a thrust producer which does not make use of the surrounding atmosphere. A rocket of the type with which my invention is concerned is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as the liquid propellant material can be carried in a light weight low pressure vessel and pumped into the combustion chamber, the latter though it must withstand high pressure and temperature, being only necessarily large enough to insure combustion. Also, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle.

Various liquids and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a hypergolic fuel component such as ethyl alcohol-water, ammonia, hydrazine, or hydrogen; and nitric acid as the oxidizer with aniline or furfuryl alcohol as the hypergolic fuel component.

When employing 90–100 percent or more nitric acid, i. e., "white fuming nitric acid" as the oxidizer in a rocket bipropellant, it is often necessary, dependent on the specific fuel component, to make ignition more prompt by dissolving from 6 to 14 percent by weight of nitrogen dioxide in the white fuming nitric acid forming thereby "red fuming" nitric acid. A fuel component of a bipropellant material of the type described herein, is spontaneously ignited upon contacting the oxidizer, and for that reason is referred to herein as being "hypergolic." A ratio of oxidizer to hypergolic fuel based on stoichiometric amounts can be utilized within the limits of 0:5:1 to 1.5:1 if desired, the efficiency of the combustion being less at ratios below 1:1 and the use of the oxidizer being less economical at ratios above 1:1. However, practical considerations may necessitate the use of higher ranges, even as high as 6:1

An object of this invention is to provide new rocket propellants. Another object is to provide hypergolic fuels. Another object is to provide a method for producing immediate thrust to a rocket. Other objects will be apparent to those skilled in the art from the accompanying discussion and disclosure.

In accordance with a broad embodiment of our invention we have provided rocket bipropellant materials, the fuel components of which comprise hydrocarbyl substituted furans characterized by the structural formula

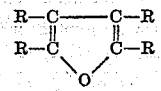

wherein R is a hydrogen atom or a hydrocarbyl radical having not more than 12 carbon atoms, wherein the total number of carbon atoms present in the formula is not greater than 16 and wherein at least one R is a hydrocarbyl radical, that is wherein there are at least 5 carbon atoms present in the formula. Accordingly, R may be a hydrogen atom or a hydrocarbyl radical selected from the group consisting of alkyl, alkenyl, aryl, cycloalkyl, cycloalkenyl, aralkyl and alkaryl radicals, the alkyl radical, especially those having less than 3 carbon atoms, being preferred. These hydrocarbyl substituted furans are also hypergolic when diluted with non-hypergolic materials, particularly hydrocarbons, even in a state of dilution of 20–40 percent by volume and in some cases as high as 80 to 90 and higher percent by volume. Suitable non-hypergolic diluents include the normally liquid hydrocarbons or mixtures thereof such as the hydrocarbons n-heptane, toluene, isooctane, benzene, diisobutylene, gasolines, jet fuels, kerosene and the like.

Illustrative of the hypergolic hydrocarbyl substituted furans used in the fuels of our invention are 2-methylfuran, 2,5-dimethylfuran. Other hydrocarbyl substituted furans such as 2,5-diethylfuran, 2,3,4-trimethylfuran, 3-propylfuran, 2,3,4,5-tetramethylfuran, 2-ethylfuran, 2-phenylfuran, 2-cyclohexylfuran, 2-cumenylfuran, 2,5-dicyclohexylfuran, 2-cyclopropylfuran, 2,5-dicyclopentenyl-furan, 2-benzylfuran, 2,5-tert-butylfuran are suitable, as well as their higher and lower molecular weight homologs. The 2-alkyl substituted and 2,5-alkyl substituted furans are preferred.

Suitable oxidizers in addition to white or red fuming nitric acid can be used in the bipropellant fuel composition of our invention, particularly other oxidants such as hydrogen peroxide, ozone, nitrogen tetroxide, oxygen and mixed acids, particularly anhydrous mixtures of nitric and sulfuric acids such as 80–90 percent by volume white or red fuming nitric acid and 20–10 percent by volume anhydrous or fuming sulfuric acid. It is within the scope of this invention to employ, preferably dissolved in the oxidizer, ignition or oxidation catalysts. These oxidation catalysts include certain metal salts such as the chlorides and naphthenates of iron, zinc, cobalt and similar heavy metals.

The advantages of this invention are illustrated in the following examples. The reactants and their proportions and their specific ingredients are presented as being typical and are not to be construed to limit the invention.

EXAMPLE I

Each of the hydrocarbyl substituted furans described hereinbelow was tested for spontaneous ignition, employing fuming nitric acid as the oxidizer. In each test 1 part by volume of a mixture of hydrocarbyl substituted furan and n-heptane was dropped into a vessel containing 2.3 parts by volume fuming nitric acid. The mixture of hydrocarbyl substituted furan and n-heptane upon coming into contact with the fuming nitric acid ignited spontaneously. Normal heptane was employed as a diluent to determine the maximum amount of dilution a hydrocarbyl substituted furan could tolerate and still retain its hypergolicity. Tests were conducted at room temperature, about 70° F. The results are set forth in Table No. 1.

Table No. 1

| Compound | Oxidant | Maximum Dilution, Percent Vol. n-heptane |
|---|---|---|
| 2-methylfuran | white fuming nitric acid | 40 |
| Do | red fuming nitric acid | 20 |
| 2,5-dimethylfuran | do | 30 |
| Do | white fuming nitric acid | 20 |

EXAMPLE II

Tests were conducted according to the method outlined in Example 1 wherein the temperature of the candidate hydrocarbyl substituted furan and the oxidant was lowered to —40° F. The results are set forth in Table No. 2.

Table No. 2

| Compound | Oxidant | Maximum Dilution, Percent Vol. n-heptane |
|---|---|---|
| 2-methylfuran | white fuming nitric acid | 20 |
| 2,5-dimethylfuran | red fuming nitric acid | 20 |

As will be evident to those skilled in the art, various modifications can be made or followed, in the light of the foregoing disclosure and discussion without departing from the spirit or scope of the disclosure or from the scope of the claims.

We claim:

1. In the method for developing thrust by the combustion of bipropellant components in a combustion chamber of a reaction motor the steps comprising separately and simultaneously injecting a stream of an oxidant component and a fuel component into contact with each other in the combustion chamber of said motor, in such proportions as to produce spontaneous ignition, said fuel component comprising a hydrocarbon substituted furan characterized by the structural formula

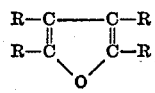

wherein R is selected from the group consisting of a hydrogen atom, alkyl, alkenyl, aryl, cycloalkyl, cycloalkenyl, aralkyl and alkaryl hydrocarbon radicals having not more than 12 carbon atoms, wherein the total number of carbon atoms present in said formula is not greater than 16, and wherein at least one R is one of said hydrocarbon radicals.

2. In the method for developing thrust by the combustion of bipropellant components in a combustion chamber of a reaction motor the steps comprising separately and simultaneously injecting a stream of an oxidant component and a fuel component into contact with each other in the combustion chamber of said motor, in such proportions as to produce spontaneous ignition, said fuel component being a 2-alkyl furan wherein said alkyl group contains not more than 12 carbon atoms.

3. In the method for developing thrust by the combustion of bipropellant components in a combustion chamber of a reaction motor the steps comprising separately and simultaneously injecting a stream of an oxidant component and a fuel component into contact with each other in the combustion chamber of said motor, in such proportions as to produce spontaneous ignition, said fuel component being a 2,5-dialkyl furan having not more than 16 carbon atoms per molecule.

4. The method of claim 1 wherein said fuel component is dissolved in a non-hypergolic liquid hydrocarbon.

5. The method of claim 1 wherein said fuel component is 2-methylfuran.

6. The method of claim 1 wherein said fuel component is 2,5-dimethylfuran.

7. The method of claim 1 wherein said fuel component is 2,5-tertbutylfuran.

8. The method of claim 1 wherein said fuel component is 2-phenylfuran.

9. The method of claim 1 wherein said fuel component is 2,5-dicyclopentenylfuran.

References Cited in the file of this patent

UNITED STATES PATENTS

| 2,321,311 | Mottlau et al. | June 8, 1943 |
| 2,554,687 | Thompson et al. | May 29, 1951 |
| 2,573,471 | Malina et al. | Oct. 30, 1951 |

OTHER REFERENCES

"Rockets," May-August 1946, page 7.

Journal of the American Rocket Society, No. 72, December 1947, publ. by The American Rocket Society, Inc., page 7.